US012639627B2

(12) United States Patent
Milluzzi et al.

(10) Patent No.: US 12,639,627 B2
(45) Date of Patent: May 26, 2026

(54) TRAINING OF MACHINE LEARNING MODELS WITH HARDWARE-IN-THE-LOOP SIMULATIONS

(71) Applicant: DISNEY ENTERPRISES, INC., Burbank, CA (US)

(72) Inventors: Andrew Jesse Milluzzi, Clermont, FL (US); Faith Elizabeth Smith Haslebacher, Clermont, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 895 days.

(21) Appl. No.: 17/901,053

(22) Filed: Sep. 1, 2022

(65) Prior Publication Data

US 2024/0078465 A1 Mar. 7, 2024

(51) Int. Cl.
*G06N 20/20* (2019.01)
*G06F 9/455* (2018.01)
*G06N 20/00* (2019.01)

(52) U.S. Cl.
CPC ............. *G06N 20/00* (2019.01); *G06F 9/455* (2013.01); *G05B 2219/23446* (2013.01)

(58) Field of Classification Search
CPC ........... G05B 2219/13186; G05B 2219/14071; G05B 2219/23446; G01R 31/2836; G01R 31/2846; G01R 31/2848
See application file for complete search history.

(56) References Cited

U.S. PATENT DOCUMENTS 11,010,510 B2 5/2021 Hofer et al.
11,366,945 B2 6/2022 Milluzzi et al.
(Continued)

FOREIGN PATENT DOCUMENTS

CN 102708294 A 10/2012
JP 2015114901 A 6/2015
(Continued)

OTHER PUBLICATIONS

Bou et al., "An Online Data-Driven Method for Simultaneous Diagnosis of IGBT and Current Sensor Fault of Three-Phase PWM Inverter in Induction Motor Drives", vo. 35, No. 12, May 13, 2020, pp. 13281-13294, retrieved on Aug. 4, 2020.
(Continued)

*Primary Examiner* — Grace Park
(74) *Attorney, Agent, or Firm* — Dorsey & Whitney LLP

(57) ABSTRACT
A method for training a control system model includes introducing a simulated fault into a software simulation of a physical system and generating emulated sensor data based on the simulated fault, where the emulated sensor data emulates output from one or more sensors of the physical system. The method further includes obtaining output data from a test control system provided with the emulated sensor data, where the test control system emulates a control system of the physical system and tagging the output data with the simulated fault to create training data. The method further includes utilizing the training data to train the control system model, where the control system model is a machine learning model for use with the control system of the physical system during operation of the physical system.

19 Claims, 5 Drawing Sheets

(56) References Cited

U.S. PATENT DOCUMENTS

| | | | | |
|---|---|---|---|---|
| 2016/0147920 A1* | 5/2016 | Goulkhah | ............... | G06F 30/20 |
| | | | | 703/21 |
| 2016/0357895 A1* | 12/2016 | Hyde | ....................... | G06N 7/01 |
| 2020/0349234 A1 | 11/2020 | Hofer et al. | | |
| 2022/0128522 A1 | 4/2022 | Visser et al. | | |
| 2022/0137583 A1 | 5/2022 | Lovegrove | | |
| 2022/0269259 A1 | 8/2022 | Albrecht et al. | | |
| 2024/0070041 A1* | 2/2024 | Matei | ................. | G06F 11/2263 |

FOREIGN PATENT DOCUMENTS

| | | | | | |
|---|---|---|---|---|---|
| WO | 2019142728 A1 | 7/2019 | | | |
| WO | WO-2022182345 A1 * | 9/2022 | ............. | G06N 3/047 |

OTHER PUBLICATIONS

Extended European Search Report for European Patent Application No. 23194863.9 dated Feb. 5, 2024, 9 pages.
"Examination Report for EP Appl. No. 23194863.9, mailed on Jun. 5, 2025 pp. all".

\* cited by examiner

100

105

105

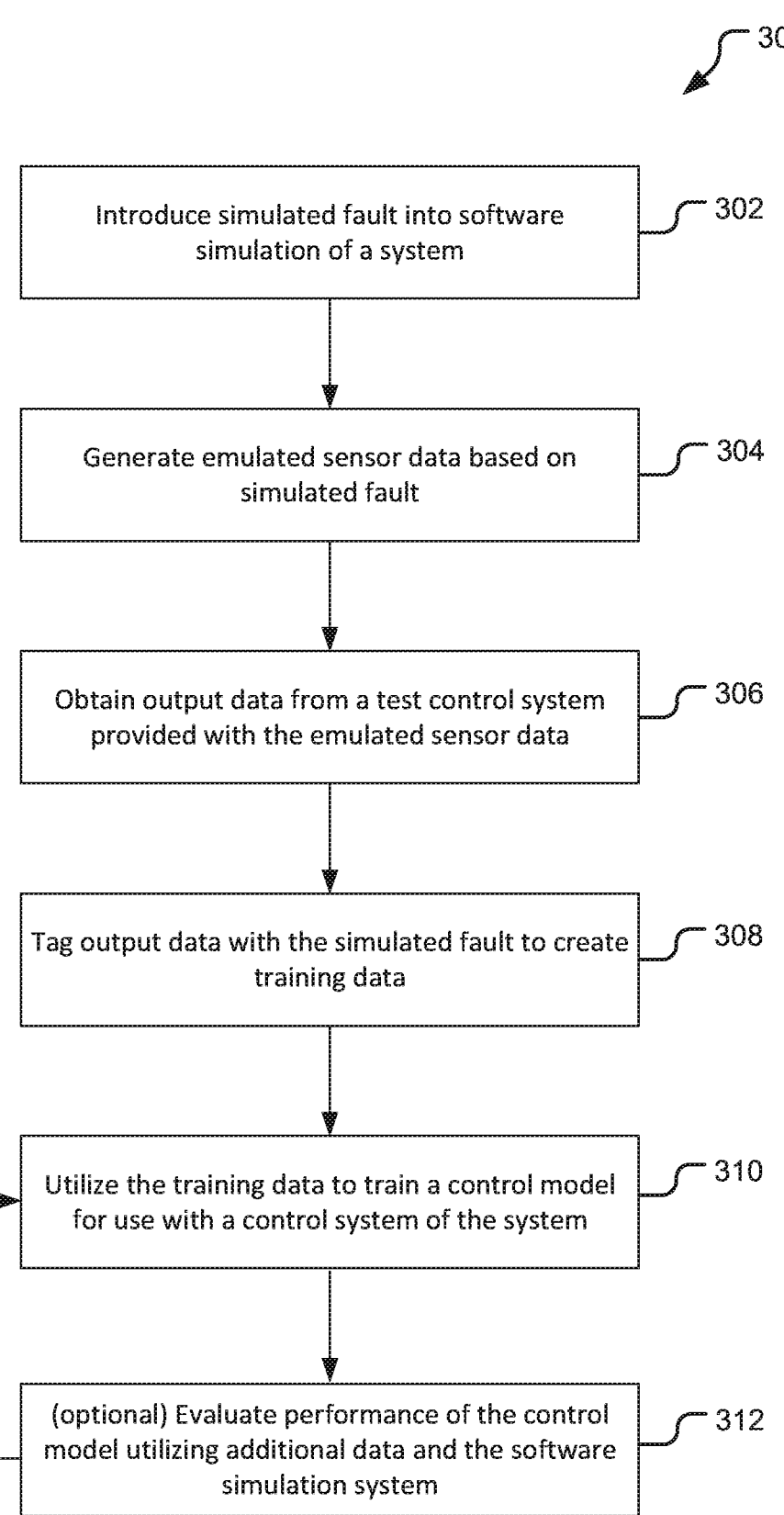

300

Introduce simulated fault into software simulation of a system ⟶ 302

Generate emulated sensor data based on simulated fault ⟶ 304

Obtain output data from a test control system provided with the emulated sensor data ⟶ 306

Tag output data with the simulated fault to create training data ⟶ 308

Utilize the training data to train a control model for use with a control system of the system ⟶ 310

(optional) Evaluate performance of the control model utilizing additional data and the software simulation system ⟶ 312

FIG. 5

TRAINING OF MACHINE LEARNING MODELS WITH HARDWARE-IN-THE-LOOP SIMULATIONS

CROSS-REFERENCE TO RELATED APPLICATIONS

This application is related to U.S. Pat. No. 11,010,510, filed Apr. 30, 2019, entitled "SOFT-REAL-TIME HUB PROVIDING DATA TRANSPORT FOR PROCESSOR-IN-LOOP (PIL) SIMULATIONS," and U.S. Pat. No. 11,366, 945, filed May 3, 2021, entitled "SOFT-REAL-TIME HUB PROVIDING DATA TRANSPORT FOR PROCESSOR-IN-LOOP (PIL) SIMULATIONS," the disclosures of which are incorporated herein by reference in their entireties for any purpose.

BACKGROUND

Control systems are generally used to control complex mechanical and electromechanical systems. For example, theme park attractions, such as rollercoasters, rides, or the like, including control that monitor and actuate ride vehicles, and other aspects of the attraction may be controlled by control systems. Various control systems may also be used to assist in repair and/or maintenance of such systems, by identifying components within such systems in need of repair or replacement. However, control systems often evaluate the current state of a mechanical or electromechanical system and may not identify component malfunctions before they occur or before components need to be replaced for a system to remain operational. Further, such control systems may be unable to identify rare events occurring within a system, such as external physical conditions, system components that fail infrequently, and the like.

Control systems, including software controllers, are frequently used to control and monitor complex mechanical systems. For example, amusement park attractions may include complex ride systems controlled by control systems. Such attractions may further include show systems provided along a length of a ride system and/or about a travel path of ride vehicles, which show systems may be controlled and monitored by control systems to provide proper presentation of shows provided by the show systems. Other types of complex mechanical systems, such as automated production and/or manufacturing systems, warehouse systems including autonomous and/or other mechanical components, and the like, may also be controlled by similarly complex control systems.

BRIEF SUMMARY

An example method disclosed herein includes introducing a simulated fault into a software simulation of a physical system and generating emulated sensor data based on the simulated fault, where the emulated sensor data emulates output from one or more sensors of the physical system. The method further includes obtaining output data from a test control system provided with the emulated sensor data, where the test control system emulates a control system of the physical system and tagging the output data with the simulated fault to create training data. The method further includes utilizing the training data to train a control system model, where the control system model is a machine learning model for use with the control system of the physical system during operation of the physical system.

Optionally, in some examples, the simulated fault is introduced into the software simulation of the physical system using Monte Carlo techniques.

Optionally, in some examples, the physical system includes a plurality of sub-systems, where each of the plurality of sub-systems is controlled by the control system.

Optionally, in some examples, the physical system includes a plurality of sub-systems, where the control system controls one of the plurality of sub-systems.

Optionally, in some examples, the simulated fault replicates a real-world condition of the physical system.

Optionally, in some examples, tagging the output data includes tagging the output data with the physical condition introduced to the software simulation of the physical system.

Optionally, in some examples, the method further includes utilizing the control system model with the control system of the physical system to identify one or more physical conditions in the physical system.

Optionally, in some examples, the method further includes evaluating performance of the control system model utilizing additional data and the software simulation of the physical system.

An example system disclosed herein includes a software simulation system including a software simulation of a physical system, where the software simulation system is configured to generate emulated sensor data based on input to the software simulation system, where the emulated sensor data emulates output from one or more sensors of the physical system. The system further includes a test control system emulating a control system of the physical system, where the test control system is configured to generate control system output based on the emulated sensor data.

Optionally, in some examples, the system further includes a control model trained to identify one or more physical conditions in the physical system based on the output from the one or more sensors of the physical system, where the control model is trained using the information provided by the test control system responsive to the emulated sensor data. Optionally, in some examples, the control model is a machine learned model trained using the output generated by the test control system. Optionally, in some examples, the control model is further trained using data collected from the control system of the physical system during operation of the physical system.

Optionally, in some examples, the software system comprises an input/output (I/O) emulation interface, where the I/O emulation interface provides the emulated sensor data to the test control system.

Optionally, in some examples, the test control system includes one or more hardware components included in the control system of the physical system.

An example method disclosed herein includes receiving, at a hardware-in-loop (HIL) simulation of a physical system, programmatic data input including at least one injected fault, where the at least one injected fault is representative of a physical condition in a physical system, where the at least one injected fault is injected into the programmatic data input using Monte Carlo techniques. The method further includes generating, by the HIL simulation, control system outputs where the control system outputs correspond to outputs of a control system controlling the physical system and generating a dataset by tagging the control system outputs using the programmatic data input including the at least one fault. The method further includes training a control model using the dataset, where the control model is trained to identify the physical condition in the physical system based on the outputs of the control system controlling the physical system.

Optionally, in some examples, the method further includes expanding the dataset using data collected from the control system controlling the physical system responsive to operations of the physical system.

Optionally, in some examples, the method further includes utilizing the control model with the control system controlling the physical system to identify one or more physical conditions in the physical system.

Optionally, in some examples, the control model is a machine learned model.

Optionally, in some examples, generating the control system outputs includes generating emulated sensor data based on the at least one fault and obtaining the control system outputs from a test control system provided with the emulated sensor data.

Optionally, in some examples, the test control system emulates the control system controlling the physical system.

BRIEF DESCRIPTION OF THE SEVERAL VIEWS OF THE DRAWINGS

FIG. 5 is a flow chart of a process for training a control system model, in accordance with various examples of the disclosure.

DETAILED DESCRIPTION

Figure 1A:
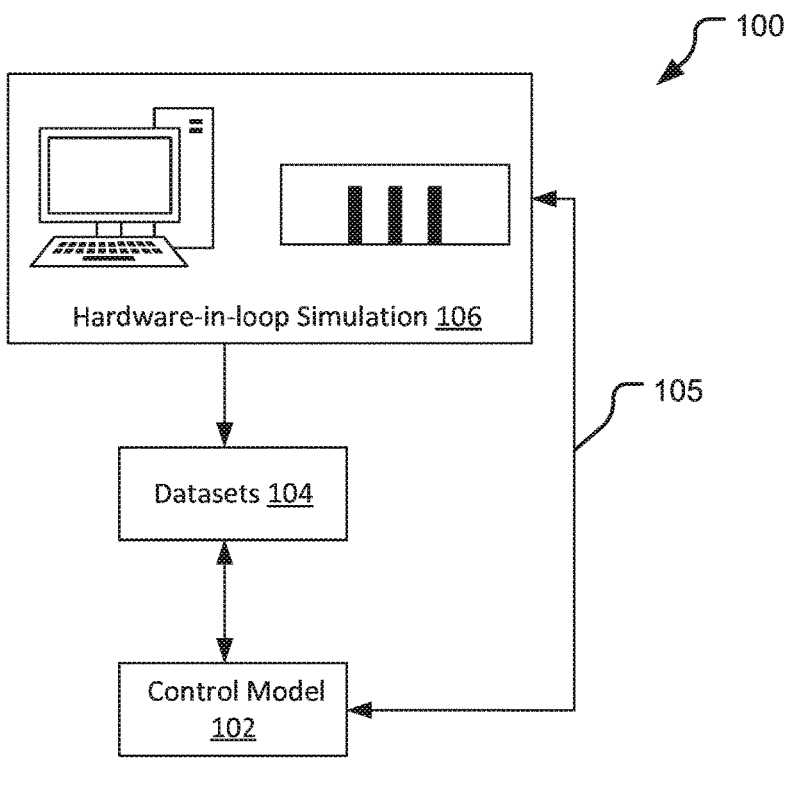
FIG. 1A is a block diagram of a system used to train a machine learned model for use with a control system, in accordance with various examples of the disclosure.

The present disclosure include embodiments for improving performance and accuracy of various control systems, such as those used for controlling complex electromechanical systems. For example, machine learned models are used to quickly and accurately identify and/or correct physical conditions in the mechanical systems controlled by the control systems. The machine learned models may detect wear on components of a mechanical system (e.g., brakes, motors), issues with sub-systems of a large mechanical system (e.g., timing on gates, conveyance systems, and the like), external physical conditions (e.g., environmental conditions causing malfunctions in a mechanical system), and other physical conditions affecting the function of a mechanical system. Where the control system can correctly identify such physical conditions, the control system may provide feedback to system operators, maintenance personnel, and the like, to correct the physical conditions. Control systems utilizing machine learned models may provide improved detection of such events, such that components of mechanical systems can be repaired and/or replaced more quickly, resulting in decreased downtime. For example, physical conditions likely to result in eventual failure may be identified sooner, such that system components may be replaced during planned system downtime rather than during unplanned system downtime caused by component failure.

Such machine learned models are generally trained before being used by a control system. The type of training may affect how effective a given control system is in detecting and identifying physical events in the mechanical system which may, if uncorrected, cause downtime, malfunctions, or damage to the mechanical system. For example, a machine learned model trained using unsupervised learning may be trained on data fed to the model from the system itself and may, accordingly, be unable to identify physical events that have not occurred in the physical system before. Machine learned models trained using supervised learning techniques may be more able to more accurately identify a variety of physical events before an adverse outcome occurs. However, supervised learning uses tagged data, and such tagged data may be difficult to generate for complex mechanical and electromechanical systems, especially for physical conditions that occur infrequently within the system.

Tagged data used to train machine learning models may be generated by looking at sensor data received at a control system for a system prior to a failure of the system or a component of the system. However, collecting such data from the system itself may result in a limited dataset. For example, a system may run for a long time without exhibiting failures, especially failures that are rare, odd, or unlikely.

Injecting particular failures into the actual mechanical system may result in significant system downtime, cost, and possible damage to the system. For example, adding a motor that is beginning to malfunction into the system may be done by taking the system offline, removing a functioning motor, and physically connecting the malfunctioning motor. The system may then be run with the malfunctioning motor until the motor fails. The motor may run for a high number of cycles before failure, resulting in long downtime for the system. Further, running the system until failure of the motor may result in negative impacts on other parts of the system, such as components functioning differently to compensate for a failing component. Additionally, some failures (e.g., collisions of system components) may be impractical or impossible to inject into a system without causing damage to the system, excessive cost, and the like. Further, where the system is used, generation of such data may be time consuming due to the need to reset the system before generating new faults in the system.

The system and methods described herein may train machine learning models for use by control systems using software simulations of physical systems including hardware-in-loop (HIL) components. Such systems may be useful to simulate a variety of faults that may be difficult or impossible to detect using data collected from a physical system. For example, motor failure within a physical system may occur infrequently (e.g., several times a year or less) such that training a model to recognize such motor failure accurately may be difficult and/or time consuming. In contrast, a HIL simulation may simulate motor failure on demand, allowing for generation of multiple datasets resulting in motor failure. Accordingly, a model may be quickly trained to recognize such motor failure, and may be trained to recognize motor failure before it occurs within a physical system.

Embodiments described herein may use Monte Carlo methods to inject faults into software simulations to generate more robust training datasets for training machine learning models for use with control systems. For example, many components of mechanical and electromechanical systems may behave erratically before failure. For example, mechanically actuated locks in a system may randomly be more difficult to secure in position before ultimately malfunctioning permanently. Generating multiple datasets with such faults (e.g., a lock taking multiple attempts to secure) injected randomly and differently into a larger number of trials generally results in a model that is more able to accurately identify such conditions in a physical system. For example, a model trained based on a single dataset or several non-random datasets may be trained to look for the faults at particular points in the data. A model trained using random data may more be able to recognize faults when faults occur at different points within data collection. Moreover the models trained in such a manner may be better at identifying rare events that may not occur often within the physical systems and with the tagged Monte Carlo data can also import institutional human knowledge (e.g., from operators and mechanics of the physical system) into the trained models.

The system and methods described herein may further evaluate a control model trained for use by a control system. For example, a control model may be provided with additional data (e.g., simulated data, real world data, and/or combinations of types of data) to see how the model performs before the model is deployed for use with a physical system. For example, the HIL simulation may include elements such as an operator console simulation, which may show output that would be viewable by an operator during operation of the physical system. Accordingly, the HIL simulation may be used to determine whether a model is performing well enough to end training and/or deploy the model to a physical system.

Figure 1B:
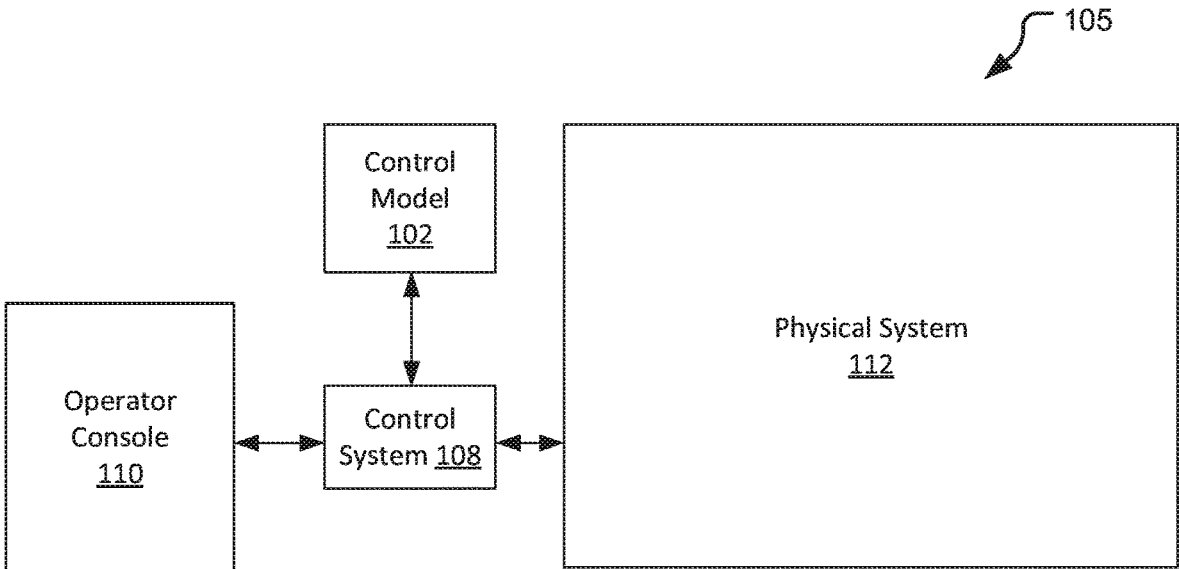
FIG. 1B is a block diagram of a system including a machine learned model in use with a control system controlling a physical system, in accordance with various examples of the disclosure.

Turning now to the figures, FIG. 1A illustrates a system 100 used to train a control model 102 for use with a control system. FIG. 1B illustrates system 105 including the control model 102 in use with a control system 108 controlling a physical system 112. Generally, the system 100 includes a HIL simulation 106 which may be used to generate datasets 104 used to train the control model 102, which may, in various examples, be a machine learned (ML) model. The trained control model 102 may be used in a system 105 including a physical system 112 and a control system 108. The trained control model 102 may be used with or incorporated into the control system 108. In various examples, the system 105 may include an operator console 110 to provide additional information about the physical system 112 to an operator of the physical system 112, in various examples. Such additional information may include physical conditions detected by the control model 102, alerting an operator or maintenance personnel to a physical condition that may be repaired to provide continued operation of the mechanical system.

The HIL simulation 106 may generally include a computing device and a test control system (e.g., hardware) in communication with the computing device. The computing device may be used to run a software simulation of the physical system 112. The computing device may be any type of computing system including, for example, a desktop computer, laptop computer, or the like. The test control system may be an approximation of the control system 108 used to control the physical system 112. For example, the test control system may include the same or similar hardware included in the control system 108. The software simulation of the physical system may generally receive input to inject faults into the simulation of the physical system. Put differently, a user may specify some condition within the software simulation, which may simulate a physical condition within the physical system 112. For example, a failing roller in a conveyance system may be generally seen by the control system 108 as an interruption in the motion of the conveyance system. Such interruptions may occur several times before ultimate failure of the roller. Accordingly, input the software simulation may include thousands of trials or iterations of data collected from a simulated conveyance system, including a number of injected faults, simulating the interruption in the motion of the conveyance system. Based on such input, the software simulation of the physical system 112 may generate output emulating output that would be provided by sensors of the physical system 112 responsive to the physical conditions creating the faults provided as input to the software simulation. For example, sensors of the physical system 112 may generate a control signal where there is a loose wheel in the physical system 112. The emulated sensor output generated by the software simulation of the physical system 112 may be the same control signal generated by the sensors of the physical system 112. That is, the test control system may receive the same control signal from the sensors of the physical system 112 and the software simulation of the physical system 112, such that the test control system behaves in the same manner whether receiving the control signal from the sensors of the physical system 112 or the emulated sensor data from the software simulation of the physical system 112. In some examples, the emulated sensor data may be generated responsive to input correlated with sensor failure, such that the control model is trained to recognize sensor failure in addition to other physical faults in the system.

The test control system may include similar or the same hardware as the control system 108 used to control the physical system 112. The test control system may generally be in communication with the software control system to receive emulated sensor data and generate control system output responsive to the emulated sensor data. Because the test control system includes similar or the same hardware as the control system 108, such control system output may be identical or substantially similar to output that would be generated by the control system 108 responsive to the same input from sensors of the physical system 112.

The HIL simulation 106 may be used to generate datasets 104. Such datasets 104 may be used to train the control model 102 and/or may be stored at various storage locations to train additional ML models. Datasets 104 may be labeled data generated by the HIL simulation 106. In some examples, such datasets 104 may include data generated by the HIL simulation 106 responsive to multiple inputs to the HIL simulation 106. Further, some datasets 104 may include data collected from a physical system 112 in addition to data generated by the HIL simulation 106. For example, a particular physical condition may arise in the physical system 112, and it may be desirable to generate additional data using the HIL simulation 106 responsive to the same physical condition, such that the control model 102 is better able to identify the physical condition during future operations of the physical system 112.

In the system 105, the control model 102 may be used with or incorporated into the control system 108 controlling the physical system 112. In some examples, the control model 102 may be trained during development of a new physical system 112, such that a new control system is developed for the physical system 112 as the control model 102 is trained. In such examples, the control system 108 may include memory and/or processing components able to store and execute the control model 102 within the control system. In other examples, the control model 102 may be used with a physical system 112 already in existence. Depending on the control system used, the control model 102 may be updated at the control system 108, or may be provided to a computing system in communication with an existing control system 108. Providing the control model 102 on a computing system in communication with a control system 108 may allow for retrofitting older control systems 108 with a control model 102 improving operation of the control system 108.

In various examples, the physical system 112 controlled using the control system 108 may be any type of mechanical or electromechanical system, such as an amusement park attraction ride system or show system, an assembly line or other automated manufacturing system, systems for warehouse logistics, self-driving or autonomous vehicles, aircraft and aerospace systems, controlled industrial processes (e.g., chemical manufacturing), ship board or maritime navigation, and the like. In various examples, the physical system 112 may include a large number of components, which may be grouped into subsystems within the larger physical system 112. For example, lighting systems, conveyance systems, sound systems, and gate systems in an attraction ride system may each be subsystems within the larger physical system 112. In some examples, such subsystems may be controlled by secondary control systems, which may be in communication with a primary control system controlling the physical system 112 as a whole.

The physical system 112 and/or the control system 108 may further be connected to or in communication with an operator console 110. The operator console 110 may be used to provide input to and receive output from the physical system 112 and/or the control system 108. For example, the operator console 110 may include switches, buttons, or other control elements operable to stop, start, or otherwise manually control (e.g., slow down) the physical system 112. The operator console 110 may further include screens, alarm elements, or other output elements to display output form the control system 108, including the control model 102. For example, the operator console 110 may include a screen providing warnings when the control model 102 identifies a physical condition based on sensor data received by the control system 108. For example, the control system 108 may receive sensor data indicating that a motor within the physical system 112 is drawing overcurrent, meaning the motor is likely to fail or otherwise malfunction. The operator console 110 may then provide information to an operator, maintenance personnel, or other personnel alerting them to the physical condition (e.g., issues with a motor in the physical system 112).

In some examples, the operator console 110 may display other information provided by the control model 102, such as an estimated time (or cycles of the physical system 112) until failure of the component. Such information may assist the operator and/or maintenance personnel in deciding how to correct the physical condition. For example, where the control model 102 is able to identify likely failure long before the actual malfunction, the component may be replaced or repaired in the next available maintenance window, instead of taking the physical system 112 down for unscheduled maintenance. Where, in contrast, malfunction or failure of a component is predicted before a scheduled maintenance window, the physical system 112 may be taken down for unscheduled maintenance to replace the component before failure. Replacing or repairing a component before full failure may reduce downtime of the physical system 112 overall, as the component is less likely to fail in a manner that may affect other components of the physical system 112.

As shown in FIG. 1A, a feedback and evaluation connection 105 between the control model 102 and the HIL simulation 106 may be used to evaluate the training of the control model 102. For example, such evaluation may be useful to determine whether to continue training of the control model 102, how the control model 102 is likely to perform in real-world conditions, and/or whether the control model 102 is performing well enough to be deployed to a physical system. Data used to evaluate the control model 102 may include tagged or untagged data generated by the HIL simulation 106, tagged or untagged real-world data, and the like. The use of real-world data may help to determine how the control model 102 is likely to perform in real-world conditions, and whether the control model 102 may benefit from additional training in various real-world scenarios. For example, untagged real-world data may include data collected from the physical system 112, including outputs from the control system 108 used with the physical system 112.

In various examples, a simulated operator console of the HIL simulation 106 may be used for such evaluation of the control model 102. For example, a simulated operator console may allow a user to provide inputs to the simulated system (e.g., by starting and stopping the simulated system and/or otherwise adjusting the simulated system) and view output from the control model 102 analogous to output that would be displayed at an operator console 110 used with the physical system 112. For example, such output may include identification of a physical condition or issue within the system, suggested actions for remedying an issue within the system (e.g., take the system down for maintenance immediately, or perform maintenance on a particular component within a specified timeframe, and the like). Such output may further include an indication that the physical condition is external to the system (such as physical obstacles causing issues with operation of a system), which physical condition may not be remedied by maintenance of the system itself. The control model 102 may be evaluated based on whether useful and/or correct output is provided to the simulated operator console, which would indicate that the control model 102 is sufficiently trained (either completely or in a specific scenario) and/or that the control model 102 is ready to be deployed for use with the physical system 112. In some examples, the feedback and evaluation connection 105 may further be used for additional refining and/or training of the control model 102 through reinforcement learning, which may provide rewards to a model based on its performance with untagged data.

Figure 2:
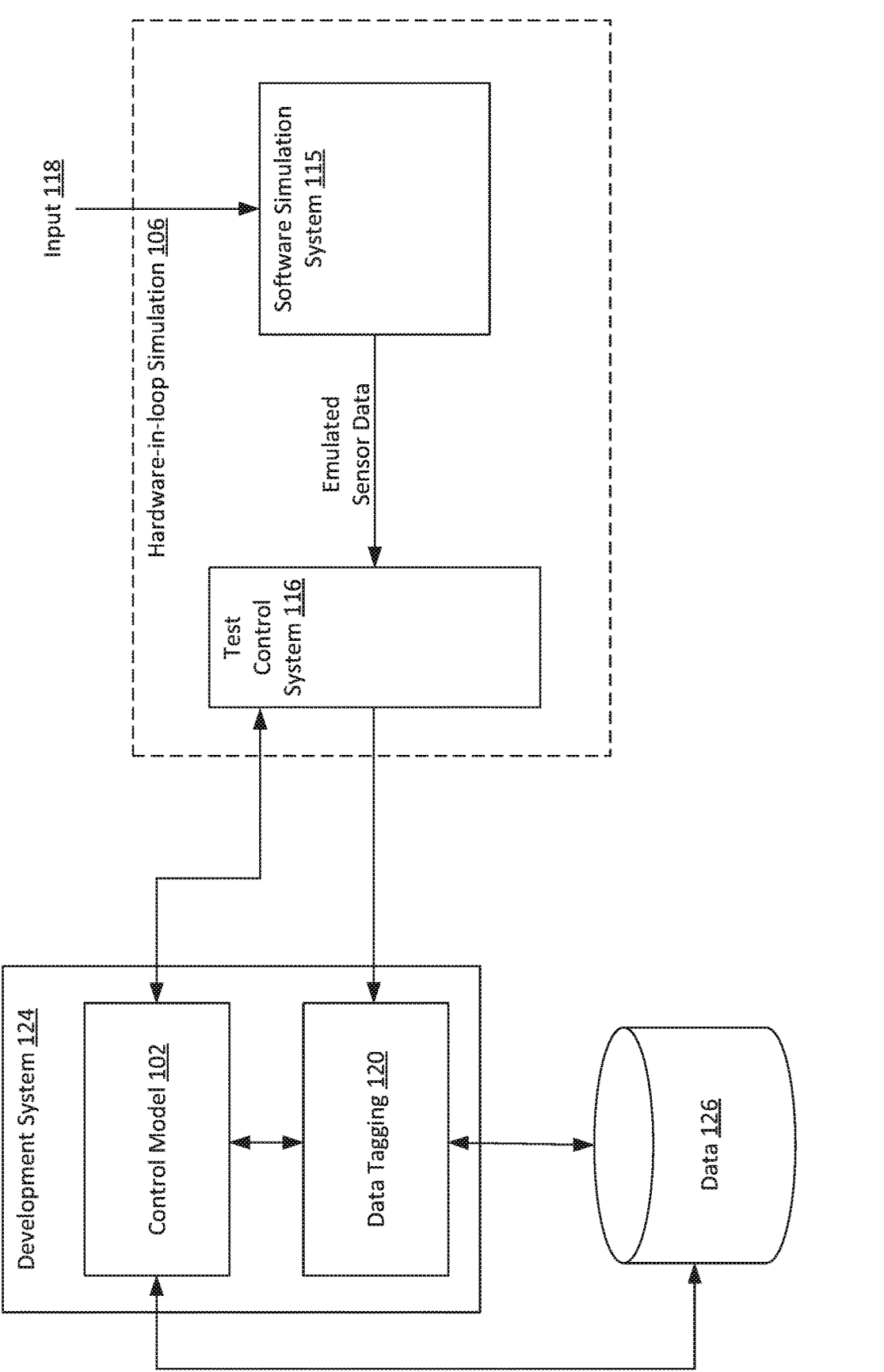
FIG. 2 is a block diagram of a hardware-in-loop simulation and a development system, in accordance with various examples of the disclosure.

Turning to FIG. 2, a HIL simulation 106 may generally include a software simulation system 114 and a test control system 116. The HIL simulation 106 may, broadly, generate control system outputs based on input to the HIL simulation 106. Such input may, for example, include various faults injected into a software simulation system 114 simulating operations of a physical system. Such control system outputs may be provided to a development system 124 for training a control model 102 (e.g., a ML model) which may be incorporated into, or used in conjunction with, a control system controlling the physical system simulated by the software simulation system 114. The development system 124 may generate datasets for training the control model 102 using data tagging 120 to correlate the input 118 provided to the HIL simulation 106 to the control system outputs received from the HIL simulation 106. Such tagged data may be stored at datastore(s) 126, which may be accessible by the control model 122 for training and refinement of the control model 102.

Figure 3:
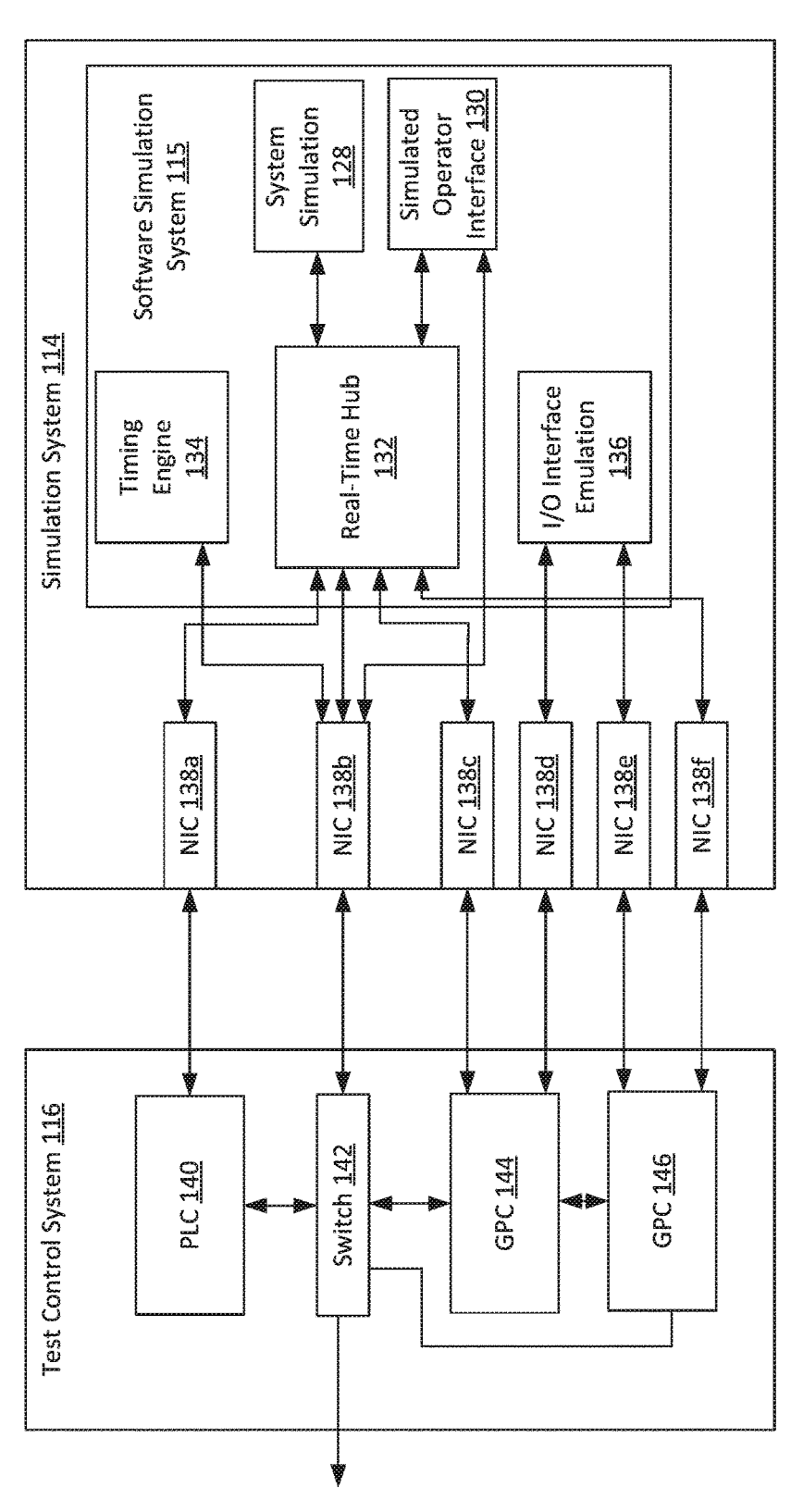
FIG. 3 is a block diagram of the hardware-in-loop simulation, in accordance with various examples of the disclosure.

FIG. 3 is a detailed block diagram of the HIL simulation 106, including the software simulation system 115 executing on a simulation system 114 and the test control system 116. The software simulation system 115 may generally be a software-based system executing on one or more computing devices (e.g., simulation system 114) configured to generate emulated sensor data based on input to the software simulation system 115. The emulated sensor data may emulate output from one or more sensors of a physical system. Such emulated sensor data may be provided to the test control system 116. The test control system 116 may generate control system outputs based on the emulated sensor data, where the control outputs correspond to outputs of a control system controlling the physical system. For example, the test control system 116 may be designed to mirror or match the components of the control system controlling the physical system, such that the control system outputs generated by the test control system 116 responsive to the emulated sensor data are identical or substantially similar to outputs of the control system responsive to corresponding sensor data from the physical system.

The simulation system 114 generally includes a software simulation system 115 executing at the simulation system 114. The software simulation system 115 generally includes a system simulation 128 and a simulation interface 130, which may connect to a data interconnection hub 132. Output from the data interconnection hub 132 may generally be combined and/or augmented with data and/or outputs from input/output (I/O) interface emulation 136 and a timing engine 134 to generate emulated sensor data. The emulated sensor data may be provided to the test control system 116 via network interface cards (NICs) 138*a*-138*f* of the simulation system 114 connected to the test control system 116.

System simulation 128 may be a simulation of a physical system. In some examples, the system simulation 128 may be a high-level simulation of the physical system, such as a plant-model or other system simulation. In some examples, the system simulation 128 may be a detailed simulation of a system, such as a system-under-control simulation or system model (e.g., a Simulink vehicle physics model or the like). Such detailed simulations may provide information about interactions between various sub-systems or sub-components of a physical system, such as sensors, doors, brakes, chains, gates, and other system elements or subsystems. The system simulation 128 may further include additional simulation tools, such system visualizers (e.g., Unity, Unreal Engine, or other like tools). The system simulation 128 may, in some examples, be updated over time based on additional information about a physical system. For example, a high-level simulation may be used for a system under development. The high-level simulation may be replaced with a more detailed simulation as the physical system is developed further. For example, the software simulation system 115 may generate output to train the control model on output from a first sensor or group of sensors, and the control models may be further trained on output from additional sensors and the additional sensors are added to the system simulation 128 (e.g., as additional components are added to the system).

Where a physical system includes a grouping of independent control systems in communication with a primary control system, the system simulation 128 may be a fleet simulator configured to simulate such a grouping. The system simulation 128 may, in some examples, include multiple simulations for various components of the physical system, which may each be independently connected to the data interconnection hub 132. For example, separate models may be used for sub-systems, such as brakes, gates, vehicle doors, conveyance systems, and other sub-systems or sub-components of the physical system.

The software simulation system 115 may further include a simulation interface 130. The simulation interface 130 may broadly provide input to, and be used to monitor output from, the system simulation 128, the data interconnection hub 132, and/or other components of the software simulation system 115. In some examples, the simulation interface 130 may include multiple different types of interfaces, such as simulated operator interfaces, simulation interfaces, and the like. The simulation interface 130 may provide one or more graphical user interfaces (GUIs) and/or programmatic interfaces to other components of the software simulation system 115. For example, the simulation interface 130 may include a simulated operator interface, which may be a GUI used to provide input to the system simulation 128, such as starting and stopping the simulation 128 or providing other operator input to the system simulation 128. The simulation interface 130 may further include a programmatic interface to provide scripted input to the system simulation 128. Other types of interfaces may include GUIs monitoring the system simulation 128, output from the software simulation system 115, and/or other components of the software simulation system 115. In some examples, a simulation interface 130 may further be a programmatic interface to collect data (e.g., injected system faults, emulated sensor data, and the like) from the software simulation system 115 and/or components of the software simulation system 115. For example, data may be collected regarding faults injected into the system simulation 130 at various times. Such data may be used to tag control output from the test control system 116 to create datasets for training the control model 122.

The system simulation 128 and the simulation interface 130 may each provide input to the data interconnection hub 132. The data interconnection hub 132 may broadly provide deterministic data transport between simulations (e.g., system simulation 128) and I/O emulation (e.g., the emulated sensor data generated by the software simulation system 115). To provide such data transport, the data interconnection hub 132 may store data in memory and transmit the data (e.g., to the test control system 116 and/or to other components of the software simulation system 115) at a user-defined interval. For example, a user may define an interval of 5 milliseconds for data processing, and the data interconnection hub may write data at 5 millisecond intervals.

The timing engine 134 and I/O interface emulation 136 may produce output which, when combined with output from the data interconnection hub 132, generate emulated sensor data responsive to input to the software simulation system 115. I/O interface emulation 136 may generally emulate the I/O interfaces of the physical system for providing emulated sensor data to the test control system 116. For example, I/O interface emulation 136 may emulate various types of I/O network interfaces, such as EtherCAT, Allen-Bradley Ethernet/IP, and the like. Such emulation may provide a transparent interface between the software simulation system 115 and the control system 116. That is, the control system 116 is unable to differentiate between emulated output generated by the software simulation system 115 and output generated by a physical system.

The timing engine 134 may allow the software simulation system 115 to provide real-time or near real-time emulated output. For example, the timing engine 134 may control the interval at which the data interconnection hub 132 transmits data to the test control system 116. For example, a user may define an interval of 5 milliseconds to control processing and communications overhead while maintaining the real-time or near real-time data transport by the software simulation system 115.

With reference to FIG. 2, input 118 may be provided to the software simulation system 115. Input 118 may be, in various examples, input to generate simulated faults in the software simulation system 115. Such input may be provided through a sub-component of the software simulation system 115, such as the simulation interface 130 and/or the system simulation 128. For example, the input may be provided programmatically to the simulation interface 130, where the simulation interface 130 accepts such programmatic data. Programmatic input may include multiple data points injected into the system simulation 128 over time to mimic incremental conditions which may eventually result in malfunction or failure of a component of a physical system being modeled by the system simulation 128. For example, break wear may be seen by a control system as random excess pressure on breaks. A control system may detect such random excess pressure anywhere from 5 to 75 times before failure. Accordingly, programmatic input may include 2500 trials of data, including 5 to 75 instances of excess pressure on the brakes. In various examples, to emulate randomness seen in the physical system, such instances may be randomly inserted into the trials using Monte Carlo methods.

In another example, motors in a system may draw more current than usual before failure. A control system may perceive such increased current draw as a series of overcurrent events. To inject the simulated fault of random excess current being drawn by a motor, a program running on the software simulation system 115 or another computing system in connection with the software simulation system 115 may instruct the software simulation system 115 to generate emulated sensor data reflecting the series of overcurrent events associated with motor failure. Such emulated sensor data may be provided to the test control system 116. In various examples, such programmatic input may be provided to the test control system 116 multiple times to create a more robust data set to train the control model 102.

The injection of faults into the trials of the programmatic input may be controlled using Monte Carlo methods, such that the faults are seen at different times in each iteration of programmatic input. As a result, the control model 102 may be more reliable at identifying such events in a physical system than a similar model trained on one event (e.g., trained using data collected from a physical system). Programmatic input to the software simulation system 115 may provide automated data generation, resulting in significant time savings over collection of data from a physical system. As generation of input to the software simulation system 115 may result in significant time savings, more robust datasets may be generated, resulting in a more accurate and useful control model 102. For example, collection of data from a physical system may require actually running the physical system, which may take significantly more time than providing programmatic input to the software simulation system 115. Further, generation of multiple datasets using the physical system may require resetting the physical system to a starting state, which may take significantly more time than resetting the HIL simulation 106.

With reference to FIG. 3, the test control system 116 may emulate a control system used to control a physical system. For example, the test control system 116 may receive emulated sensor data and provide output identical or substantially similar to output that would be generated by a control system of the physical system receiving the same sensor data. The test control system 116 may include various hardware components used in a control system controlling a physical system, and such components may be connected to the NICs 138a-138f of the simulation system 114 identically to how components of the control system would be connected to components of a physical system. For example, various components of the test control system 116 may be connected to the NICs 138a-138f of the simulation system 114 via hardwired (e.g., physical) connections and/or networked connections (e.g., a real-time I/O network provided by I/O interface emulation 136, a show network, and/or other internal networks). Such connections may allow the simulation system 114 to receive data and actions from the test control system 116, mirroring real-world communications generated by the control system 108 with the physical system 112. For example, a data packet generated by the control system 108 and received by the physical system 112, the operator console 110, or other components may be the same data packet generated by the test control system 116 and received by the simulation system 114. Such communications may be utilized by the simulation system 114 to, for example, provide output via the simulated operator interface 130 and/or to adjust the system simulation 128 responsive to signals from the test control system 116 in a similar manner to how the physical system 112 (or components of the physical system 112) would receive and respond to output from the control system 108.

As shown in FIG. 3, the test control system 116 may include hardware components such as a programmable logic controller (PLC) 140, switch 142, and generalized predictive control (GPC) units 144 and 146. Such hardware components may each be configured to receive some data from the simulation system 114 and process the received data. For example, the NICs 138a-138f of the simulation system 114 may be connected to one of the hardware components of the test control system 116. In some examples, the PLC 140 and the GPCs 144 and 146 may each receive data from the simulation system 114, process the received data, and provide the processed data to the switch 142. The data provided by the switch 142 may be the control system output from the HIL simulation 106 as a whole. Such control system output may be identical or substantially similar to output provided by a control system controlling a physical system where the output from the physical system is identical to or substantially similar to the emulated sensor data provided by the software simulation system 115.

With reference to FIG. 2, the development system 124 may generally be in communication with the HIL simulation 106 and may tag data received from the HIL simulation 106 to generate datasets used in development of (e.g., training and/or evaluation of) the control model 102. In various examples, the development system 124 may receive output from the HIL simulation 106 at data tagging 120, which may correlate such output data with the corresponding faults injected into the software simulation 115 (e.g., tagging). In some examples, such data correlation may take place within the HIL simulation 106, and data tagging 120 may otherwise format data received from the HIL simulation 106 before storage at data storage 126. For example, data tagging 120 may aggregate like datasets (e.g., datasets generated based on the same conditions within the system simulation 128) into a single dataset to use for training the control model 102. Data tagging 120 may further designate such like datasets for training or evaluation of the control model 102.

For example, a tagged dataset may be provided to the control model 102 for training, and second, untagged dataset may be provided to the control model 102 for evaluating accuracy of the control model. Output from the control model 102 may be compared to input conditions of the second dataset, which may also be stored at data storage 126.

In various examples, the datasets may be stored at data storage 126, which may be local to or otherwise accessible by the development system 124. For example, data storage 126 may be local data storage, a shared storage drive, a cloud storage location, or the like. In various examples, data storage 126 may hold multiple datasets, where the datasets are each generated to train the control model 102 to identify a different physical condition or set of physical conditions. For example, data storage 126 may include a dataset to train the control model 102 to identify brake failure, a dataset to train the control model 102 to identify motor failure, and a dataset to identify problems with actuated locks in the system.

Datasets stored at data 126 and used to train the control model 102 may be generated using the HIL simulation 106 and/or may be combinations of data generated by the HIL simulation 106 and data collected from a physical system. Use of data collected from a physical system may allow the control model 102 to identify complex problems resulting from real-world conditions that may be difficult to programmatically introduce to the HIL simulation 106 or that may be unforeseen before operation of the physical system. For example, operating a ride system with passengers may introduce physical conditions into the ride system not seen or contemplated using the system simulation 128, such as items being dropped onto tracks, liquids or other fluids (e.g., water, soda, sunscreen, and the like) carried by passengers leaking onto components of the ride system, impacts from passengers on components of the ride system, and the like. Adding datasets generated from such events may allow the control model 102 to identify issues caused by such externally introduced physical conditions, making the control model 102 more useful in diagnosing and correcting physical conditions which may lead to malfunction of the physical system.

The control model 102 may be a machine learning model trained using supervised or semi-supervised techniques. For example, the control model 102 may be trained using tagged datasets generated by the HIL simulation 106. For example, the control model 102 may be trained using feedback from the tagged datasets, and may utilize regression and classification techniques to identify physical conditions based on input data from a control system or test control system 116. In some examples, the control model 102 may be further trained to identify, in addition to a physical condition of a physical system causing particular sensor output, additional information such as estimated time to failure or malfunction of a system component (e.g., the number of cycles the physical system may run before the component will fail or otherwise malfunction).

Figure 4:
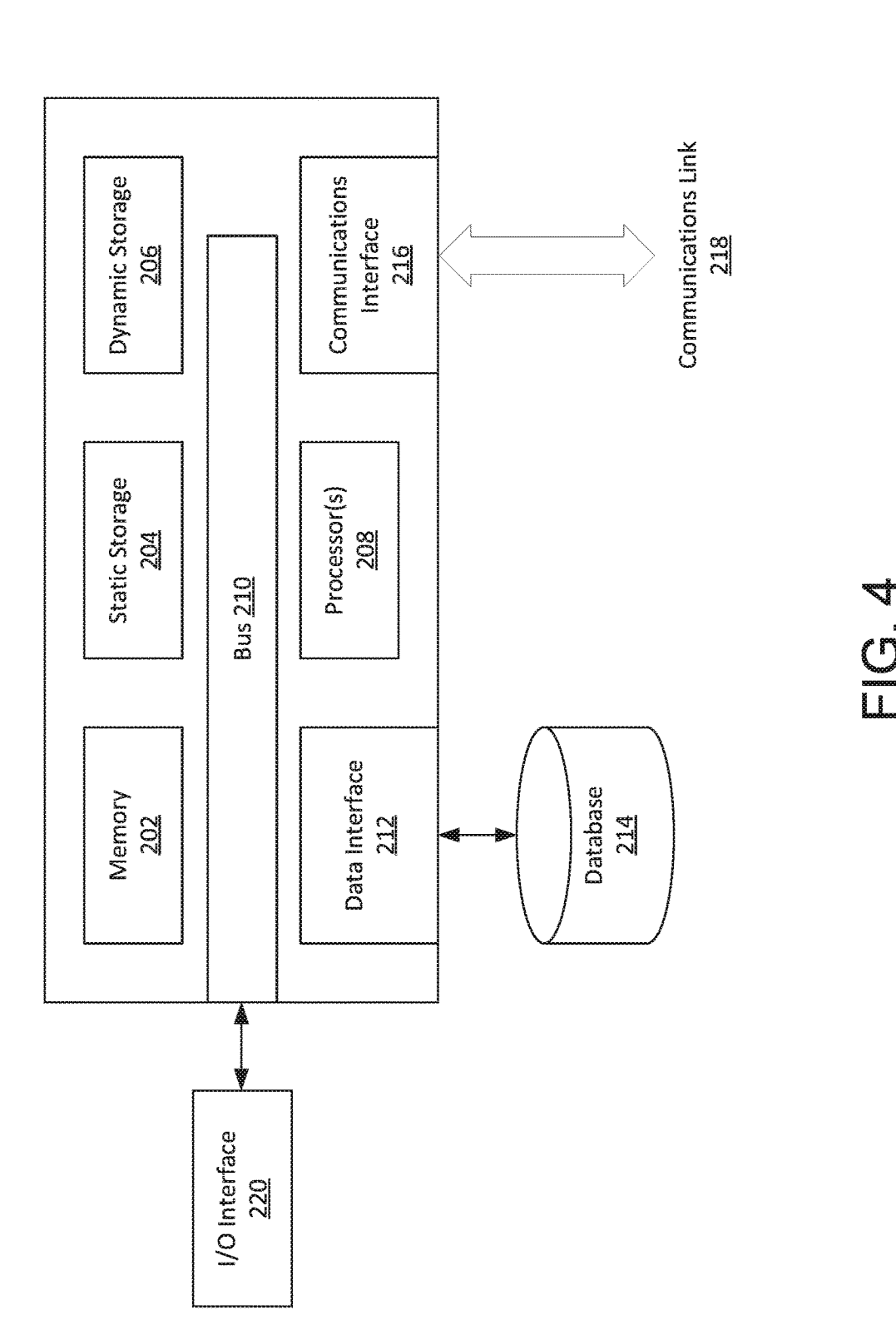
FIG. 4 is an example computing system used in various examples of the disclosure.

Turning to FIG. 4, an example computing system 200 may be used for implementing various embodiments in the examples described herein. For example, in various embodiments, the simulation system 114 and the development system 124 may be implemented by one or several computing systems 200. This disclosure contemplates any suitable number of computing systems 200. For example, the a computing system 200 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 200 may include one or more computing systems; be unitary or distributed; span multiple locations; span multiple locations; span multiple machines; span multiple data centers; or reside in a cloud, which may include one or more cloud components in one or more networks.

Computing system 200 includes a bus 210 (e.g., an address bus and a data bus) or other communication mechanism for communicating information, which interconnects subsystems and devices, such as processor 208, memory 202 (e.g., RAM), static storage 204 (e.g., ROM), dynamic storage 206 (e.g., magnetic or optical), communications interface 216 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 220 (e.g., keyboard, keypad, mouse, microphone). In particular embodiments, the computing system 200 may include one or more of any such components.

In particular embodiments, processor 208 includes hardware for executing instructions, such as those making up a computer program. For example, a processor 208 may execute instructions for the software simulation system 115. The processor 208 circuitry includes circuitry for performing various processing functions, such as executing specific software for perform specific calculations or tasks. In particular embodiments, I/O interface 220 includes hardware, software, or both, providing one or more interfaces for communication between computing system 200 and one or more I/O devices. Computing system 200 may include one or more of these I/O devices, where appropriate. One or more of these I/O devices may enable communication between a person and computing system 200.

In particular embodiments, the communications interface 216 includes hardware, software, or both providing one or more interfaces for communication (such as, for example, packet-based communication) between computing system 200 and one or more other computer systems or one or more networks. One or more memory buses (which may each include an address bus and a data bus) may couple processor 208 to memory 202. Bus 210 may include one or more memory buses, as described below. In particular embodiments, one or more memory management units (MMUs) reside between processor 208 and memory 202 and facilitate accesses to memory 202 requested by processor 208. In particular embodiments, bus 210 includes hardware, software, or both coupling components of computing system 200 to each other.

According to particular embodiments, computing system 200 performs specific operations by processor 208 executing one or more sequences of one or more instructions contained in memory 202. For example, instructions for the software simulation system 115, data tagging 120, and/or the control model 122 may be contained in memory 202 and may be executed by the processor 208. Such instructions may be read into memory 202 from another computer readable/usable medium, such as static storage 204 or dynamic storage 206. In alternative embodiments, hard-wired circuitry may be used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 208 for execution. Such a medium may take many forms, including but not limited to, nonvolatile media and volatile media. Non-volatile media includes, for example, optical or magnetic disks, such as static storage 204 or dynamic storage 206. Volatile media includes dynamic memory, such as memory 202.

Computing system 200 may transmit and receive messages, data, and instructions, including program, e.g., application code, through communications link 218 and communications interface 216. Received program code may be executed by processor 208 as it is received, and/or stored in static storage 204 or dynamic storage 206, or other storage for later execution. A database 214 may be used to store data accessible by the computing system 200 by way of data interface 212. For example, datasets for training the control model 102 may be stored using a database 214. In various examples, communications link 218 may communicate with the development system 124 and/or the simulation system 114.

FIG. 5 illustrates a process 300 for training a control system model, in accordance with various examples of the disclosure. A simulated fault is introduced into a software simulation of a system at block 302. In various examples, a simulated fault may be introduced into the software simulation system 115 as part of a larger set of data, which data may be provided programmatically to a system simulation 128 through a simulation interface 130. For example, a dataset including 1000 cycles of the simulated system may include a number of instances of overcurrent events with respect to a particular motor, resulting in eventual failure of the motor. In some examples, a simulated fault may be provided by interacting directly with the system simulation 128 through a simulation interface 130 that is, for example a GUI to the system simulation 128. Such interaction with the simulation interface 130 may, for example, include changing conditions within the simulated physical system in the system simulation 128, such as inserting an issue or component beginning to malfunction into the simulated physical system, and using the system simulation 128 to generate data responsive to the changed physical condition within the simulated system.

In some examples, faults may be introduced to the software simulation system 115 using Monte Carlo methods to inject randomness into the data. For example, malfunctioning components may frequently begin to malfunction in random ways, while appearing to function normally otherwise. For example, malfunctioning brake systems may begin to cause sensor readings indicating excess pressure on the brakes at random intervals before ultimately failing. In some examples, such excess pressure may be observed 5 to 75 times in 2500 cycles of the physical system before brake failure. By using Monte Carlo randomness techniques to insert the excess pressure readings into the input data randomly, the control model 102 is exposed to randomness, and is less likely to be trained to look for patterns in when such readings occur before failure. Accordingly, such Monte Carlo methods may result in control models 102 which are more likely to recognize such malfunctions in a physical system.

At block 304, the software simulation system 115 generates emulated sensor data based on the simulated fault. Such emulated sensor data may be generated by the data interconnection hub 132 in combination with the timing engine 134 and I/O interface emulation 136. For example, the data interconnection hub 132 may transmit data at time intervals controlled by the timing engine 134. The data interconnection hub 132 may transmit some data directly to the test control system 116 through a NIC of the simulation system 114 running the software simulation system 115 and may transmit other data to I/O interface emulation 136. I/O interface emulation 136 may then provide emulated sensor data to the test control system 116 via one or more NICs of the simulation system 114 by emulation the I/O interfaces utilized by the test control system 116. Such interface emulation may enable the simulation system 114 to provide emulated sensor data, as well as providing a transparent interface between the test control system 116 and the simulation system 114.

Output data is obtained from a test control system 116 provided with the emulated sensor data at block 306. Generally, the test control system 116 may produce output based on the emulated sensor data received by various hardware components of the test control system 116. For example, a PLC 140, GPCs 144 and 146, and a switch 142 may each receive some emulated sensor data from the simulation system 114. The hardware components may each process the respective received sensor data. In some examples, the processing components (e.g., the PLC 140 and the GPCs 144 and 146) may each provide respective output to the switch 142, which may include logic to provide the overall output of the test control system 116. As the test control system 116 may include hardware identical or substantially similar to a control system 108 controlling a physical system 112, the output generated by the test control system 116 may be identical to or substantially similar to output that would be generated by the control system 108 responsive to the same input from the physical system 112.

Output data is tagged with the simulated fault to create training data at block 308. In various examples, the output data may be tagged based on the input provided to the software simulation system 115 at block 302. Such tagging may occur before or after the output data is received from the test control system 116 by a development system 124. For example, the test control system 116 may produce one output data point for every cycle of input resulting in corresponding emulated sensor data provided to the software simulation system 115. Each such output data point may be tagged with the corresponding conditions provided as input to the software simulation system 115, including one or more faults provided as input to the software simulation system 115.

In some examples, the tagged data may be further processed at the development system 124 and/or stored at a location accessible by the development system 124 (e.g., datastore 126). For example, further processing may include correlating generated datasets with other datasets, including those generated by the HIL simulation 106 and/or those generated by collecting data from a corresponding physical system 112. In some examples, processing may include removing tags from some data and saving the untagged data and the tagged data at a datastore 126. Untagged data may then be used to validate the control model 102, that is, the data may be provided to the trained control model 102 to evaluate performance of the control model 102 against the tagged data set. Such evaluation may help to determine whether a control model 102 would benefit from additional training for a particular physical condition or can likely accurately identify the physical condition in a physical system 112.

At block 310, the training data is utilized to train a control model 102 for use with a control system 108. For example, the datasets may be used to train the control model 102 using supervised or semi-supervised learning techniques, where the control model 102 learns to classify input data using the tagged data. In some examples, the datasets may be further utilized to evaluate and/or validate the trained control model 102. Such evaluation may provide feedback to determine whether the control model 102 may be improved with further training using tagged datasets. In some examples, a control model 102 may be trained to identify various physical conditions separately and/or in conjunction with one another. For example, the control model 102 may be trained to recognize brake wear using a first dataset or group of datasets with injected faults corresponding to brake wear, then may be trained to recognize motor malfunction using a second dataset or group of datasets with injected faults corresponding to motor malfunction. The control model 102 may further be trained using a dataset or group of datasets including injected faults corresponding to both brake wear and motor malfunction, such that the control model 102 may be used in real-world situations where multiple malfunctions may occur over a number of cycles of a physical system.

At optional block 312, the performance of the control model 102 is evaluated utilizing additional data and the software simulation system 115. Such additional data may include, in various examples, additional datasets generated by the HIL simulation 106, data collected from real-world environments (e.g., from the physical system 112), and the like. The evaluation may be performed utilizing the feedback and evaluation connection 105 between the control model 102 and the HIL simulation 106. In various examples, such evaluation may utilize the simulated operator interface 130 of the software simulation system 115 to evaluate performance of the control model 102. For example, the simulated operator interface 130 may provide output analogous to the output provided by the operator console 110 used with the physical system 112. When provided with real-world data, the simulated operator interface 130 may show the suspected physical condition within the system, suggested action to remedy the physical condition, and the like. The control model 102 may be sufficiently trained (either in its entirety or with respect to a particular scenario) when the output provided at the simulated operator interface 130 is correct and/or useful to an operator in operating the physical system 112. For example, the control model 102 may correctly diagnose a component of the system likely to fail within a particular number of cycles and may suggest maintenance of the system to replace the component within a particular timeframe to prevent failure of the component. The control model 102 may benefit from additional training where the output provided at the simulated operator interface 130 is erroneous. For example, the data provided may be real-world data generated responsive to a physical condition external to the system (e.g., an object causing an obstruction to the physical system 112 dropped on a track of the physical system 112 by a rider, where the physical system 112 is an amusement park attraction). The control model 102 may provide erroneous output where the control model 102 suggests that such a condition may be remedied by performing maintenance on one or more components of a system. In various examples, the additional data provided to the control model 102 at block 112 may be used to further train the control model 102, such as through reinforcement learning. In various examples, the method 300 may proceed from block 312 back to block 310 for further training of the control model 102 utilizing the training data.

The trained control model 102 may be used with a control system 108 of a physical system 112 to identify physical conditions within the physical system 112. For example, the control model may be in communication with or integrated into the control system 108 such that the control model 102 receives output generated by the control system 108. Based on such output provided by the control system 108, the control model 102 may provide information about physical conditions within the physical system 112. For example, the control model 102 may identify, based on output from the control system 108 that a motor within the physical system is beginning to malfunction and is likely to fail. In some examples, the control model 102 may further predict when (e.g., in how many approximate cycles of the physical system 112), the motor is likely to fail. Such information from the control model 102 may be provided to operators, maintenance personnel, and/or other personnel via various interfaces, such as an operator interface 110. Such warnings and other information provided by the control model may assist the operators and maintenance personnel in diagnosing issues within the system and maintaining the physical system 112 with less downtime for the system 112 overall.

In accordance with the above, a method of training a control model for use with a control system controlling a physical system is disclosed. The control model may improve reliability and overall uptime of the physical system by anticipating failures before they occur, allowing personnel to make educated decisions about system maintenance, and the like. A HIL simulation with Monte Carlo techniques may be used to generate training data, such that the control model is trained on robust sets of data emulating data produced by the physical system. Accordingly, a more accurate control model may be generated with less input from the physical system.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method comprising:
   introducing a simulated fault into a software simulation of a physical system, comprising:
      utilizing a Monte Carlo technique to generate random data representing the simulated fault; and
      utilizing the Monte Carlo technique to inject the random data into the software simulation at a random interval;
   generating emulated sensor data based on the simulated fault, the emulated sensor data emulating output from one or more sensors of the physical system;
   obtaining output data from a test control system provided with the emulated sensor data, the test control system emulating a control system of the physical system, wherein the output data comprises a simulated control signal generated by the test control system in response to the emulated sensor data;
   tagging the output data with the simulated fault to create training data; and
   utilizing the training data to train a control system model, the control system model being a machine learning model for use with the control system of the physical system during operation of the physical system.

2. The method of claim 1, wherein the physical system includes a plurality of sub-systems, wherein each of the plurality of sub-systems is controlled by the control system.

3. The method of claim 1, wherein the physical system includes a plurality of sub-systems, wherein the control system controls one of the plurality of sub-systems.

4. The method of claim 1, wherein the simulated fault replicates a real-world condition of the physical system.

5. The method of claim 1, wherein tagging the output data includes tagging the output data with a physical condition introduced to the software simulation of the physical system.

6. The method of claim 1, further comprising:
   utilizing the control system model with the control system of the physical system to identify one or more physical conditions in the physical system.

7. The method of claim 1, further comprising:
   evaluating performance of the control system model utilizing additional data and the software simulation of the physical system.

8. A system comprising:
   a software simulation system including a processor and memory for executing a software simulation of a physical system, the software simulation system being configured to generate emulated sensor data based on input to the software simulation system, the emulated sensor data emulating output from one or more sensors of the physical system, wherein the input to the software simulation system comprises a simulated fault of the physical system introduced to the software simulation by:
      utilizing a Monte Carlo technique to generate random data representing the simulated fault; and
      utilizing the Monte Carlo technique to inject the random data into the software simulation at a random interval; and
   a test control system emulating a control system of the physical system, the test control system configured to generate control system output based on the emulated sensor data, wherein the control system output comprises a simulated control signal generated by the test control system in response to the emulated sensor data.

9. The system of claim 8, further comprising:
   a control model trained to identify one or more physical conditions in the physical system based on the output from the one or more sensors of the physical system, the control model being trained using the control system output provided by the test control system responsive to the emulated sensor data.

10. The system of claim 9, wherein the control model is a machine learning model trained using the output generated by the test control system.

11. The system of claim 10, wherein the control model is further trained using data collected from the control system of the physical system during operation of the physical system.

12. The system of claim 8, wherein the software simulation system comprises an input/output (I/O) emulation interface, the I/O emulation interface providing the emulated sensor data to the test control system.

13. The system of claim 8, wherein the test control system includes one or more hardware components included in the control system of the physical system.

14. A method comprising:
   receiving, at a hardware-in-loop (HIL) simulation of a physical system, programmatic data input including at least one injected fault, the at least one injected fault being representative of a first physical condition in a physical system, the at least one injected fault being injected into the programmatic data input using a Monte Carlo technique, wherein injecting the at least one injected fault into the programmatic data input comprises:

utilizing the Monte Carlo technique to generate random data representing the at least one injected fault; and utilizing the Monte Carlo technique to inject the random data into the programmatic data input at a random interval;

generating, by the HIL simulation, control system outputs, the control system outputs corresponding to outputs of a control system controlling the physical system, wherein the control system outputs comprise simulated control signals generated by the HIL simulation in response to the at least one injected fault;

generating a dataset by tagging the control system outputs using the programmatic data input including the at least one injected fault; and training a control model using the dataset, the control model being trained to identify the first physical condition in the physical system based on the outputs of the control system controlling the physical system.

15. The method of claim 14, further comprising:

expanding the dataset using data collected from the control system controlling the physical system responsive to operations of the physical system.

16. The method of claim 14, further comprising:

utilizing the control model with the control system controlling the physical system to identify a second physical condition in the physical system.

17. The method of claim 14, wherein the control model is a machine learning model.

18. The method of claim 14, wherein generating the control system outputs comprises generating emulated sensor data based on the at least one injected fault and obtaining the control system outputs from a test control system provided with the emulated sensor data.

19. The method of claim 18, wherein the test control system emulates the control system controlling the physical system.

*    *    *    *    *